United States Patent [19]
Wilson

[11] 3,987,260
[45] Oct. 19, 1976

[54] GROUND AND TEST CONNECTION FOR SF₆ INSULATED BUS
[75] Inventor: Walter M. Wilson, Greensburg, Pa.
[73] Assignee: I-T-E Imperial Corporation, Spring House, Pa.
[22] Filed: Dec. 5, 1974
[21] Appl. No.: 529,816

[52] U.S. Cl. .......................... 200/148 B; 200/148 R
[51] Int. Cl.² ........................................ H01H 33/60
[58] Field of Search ........ 200/148 R, 148 B, 148 D, 200/148 F, 148; 174/17, 18, 22, 88

[56] References Cited
UNITED STATES PATENTS

| | | | |
|---|---|---|---|
| 2,813,177 | 11/1957 | Eberhard et al. | 200/148 F X |
| 3,567,885 | 3/1971 | Boersma | 200/148 R X |
| 3,665,135 | 5/1972 | Boersma et al. | 200/148 F X |
| 3,778,574 | 12/1973 | Clark | 200/148 B |
| 3,876,846 | 4/1975 | Graybill | 200/148 B |

Primary Examiner—James R. Scott
Attorney, Agent, or Firm—Ostrolenk, Faber, Gerb & Soffen

[57] ABSTRACT

A grounding and test switch for a fully enclosed pressurized gas insulated high voltage system wherein the conductors are completely isolated in an SF₆ or other gas insulating environment. The grounding switch is provided with a contact arm and a movable contact within the enclosure to engage a stationary contact connected to or on the conductor or device inside the enclosure. The contact arm is operable through a gas tight seal from outside the enclosure. The contact arm slides with respect to another stationary contact which provides a direct and positive electrical connection thereto so that the contact arm, when engaged with the first mentioned stationary contact forms a conducting bridge to ground between the first mentioned and second mentioned stationary contact.

7 Claims, 10 Drawing Figures

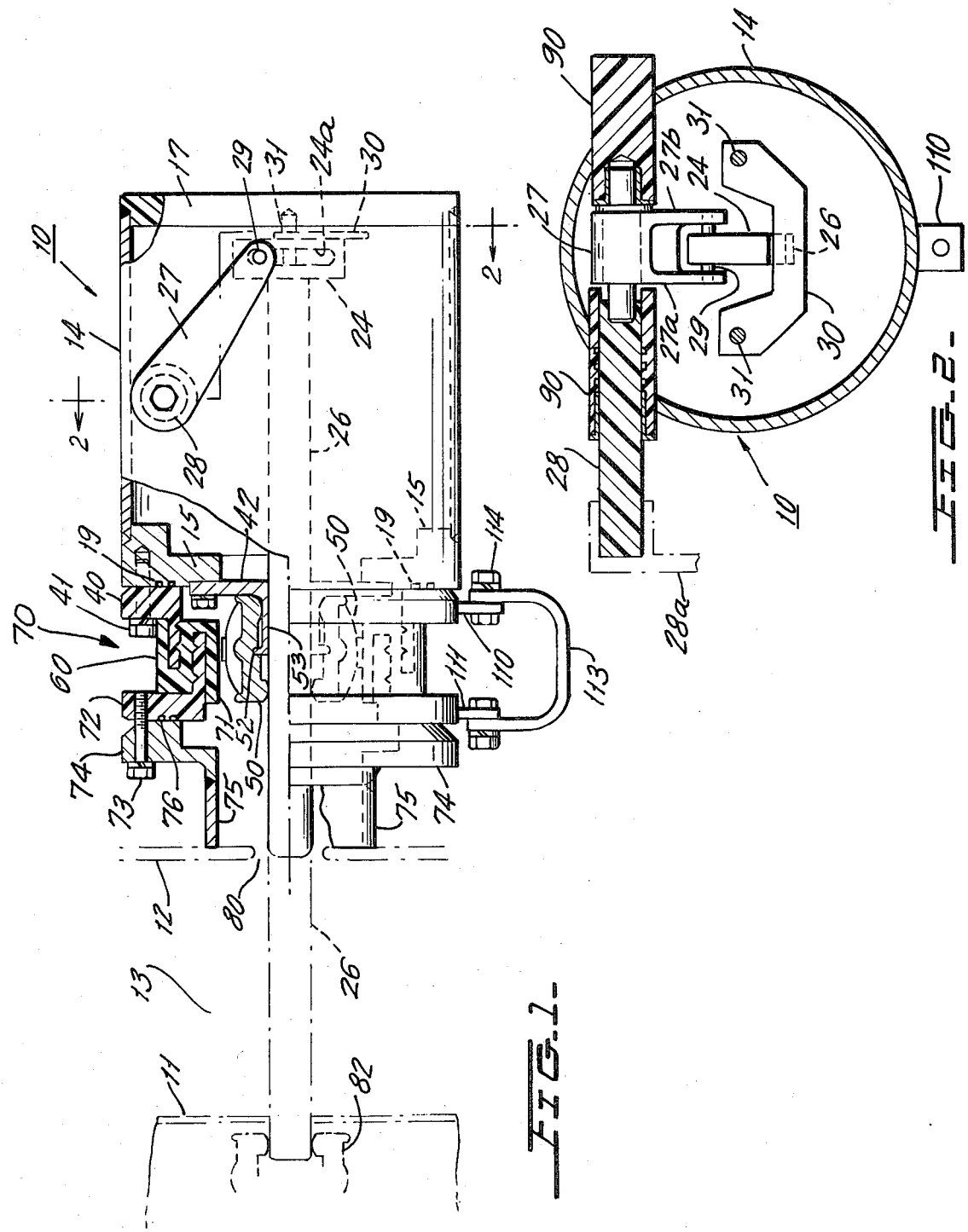

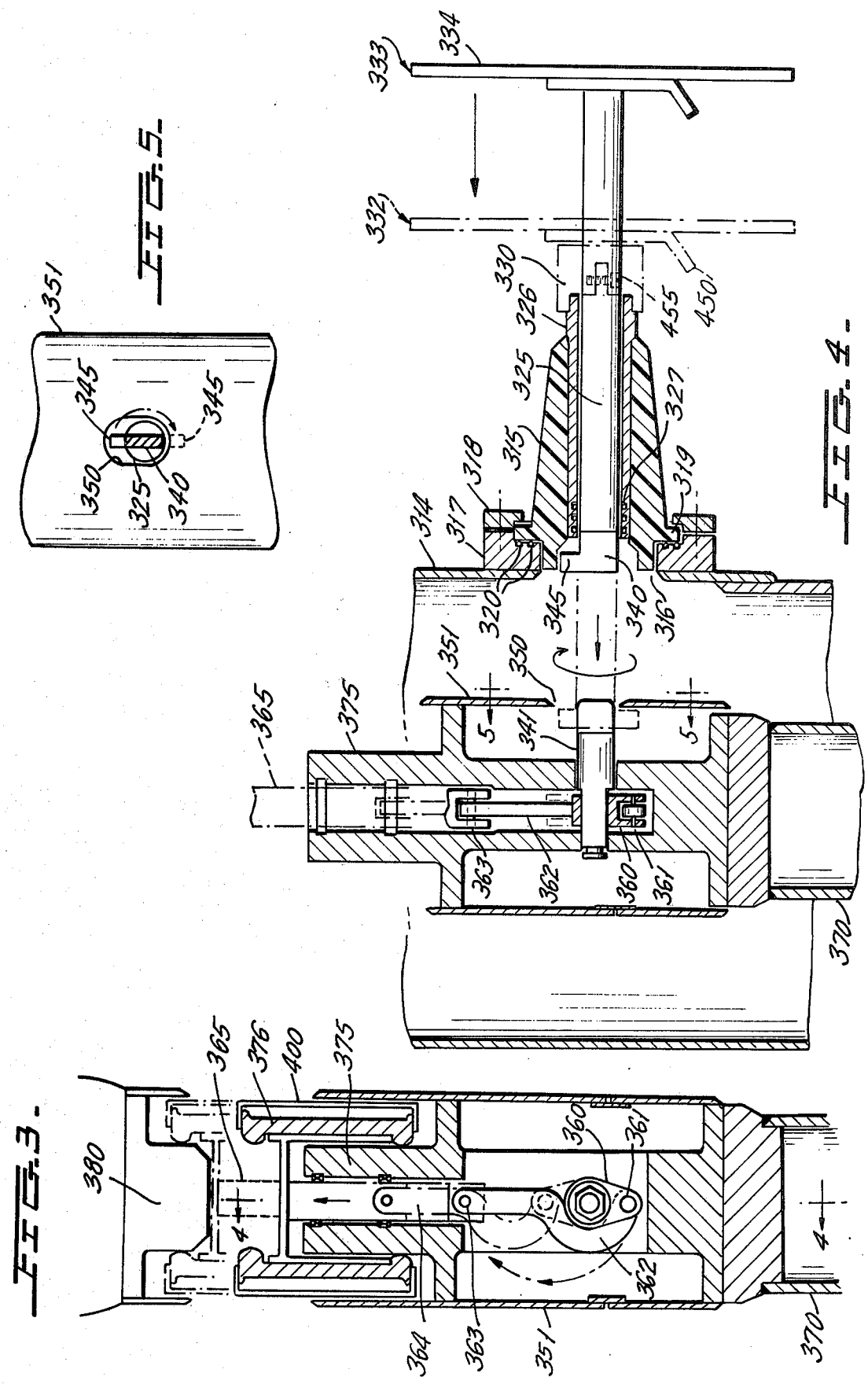

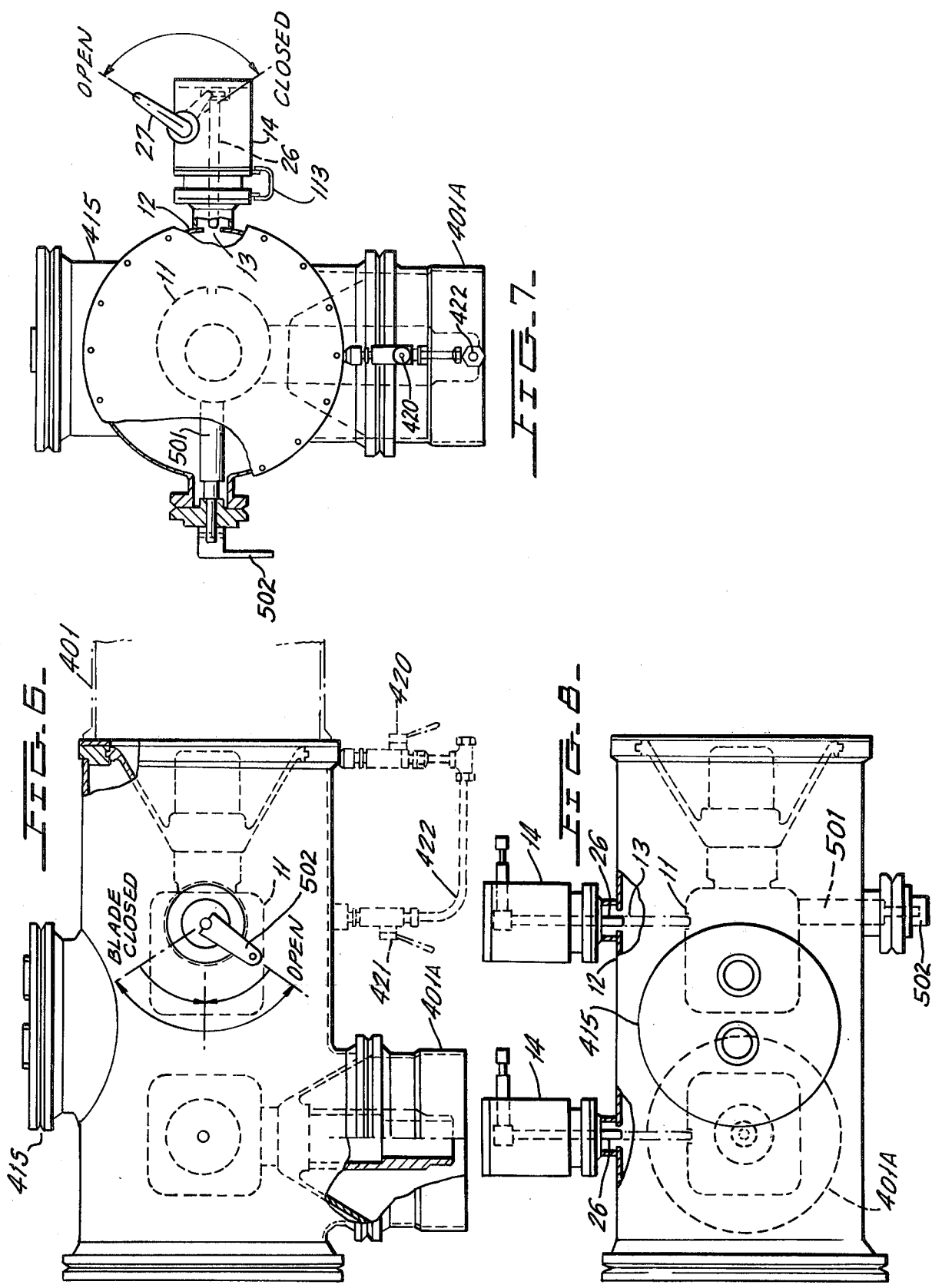

SIMPLIFIED VERSION – NOT NECESSARY TO
OPEN CENTRAL CONDUCTOR (FIGS. 1 & 2 STRUCTURE)

ALTERNATE VERSION WHERE IT IS NECESSARY
TO OPEN CENTRAL CONDUCTOR WHEN TESTING
(FIGS. 3, 4, & 5 STRUCTURE)

GROUND AND TEST CONNECTION FOR SF<sub>6</sub> INSULATED BUS

The present invention relates to pressurized gas insulated high voltage systems and more particularly to a novel combination ground and test switch apparatus for testing high voltage conductors completely enclosed in grounded metal covers without the need for either depressurizing or removing the grounded covers.

BACKGROUND OF THE INVENTION

The present invention is based on the invention disclosed in U.S. Pat. No. 3,876,846 and assigned to the assignee of the present invention and is particularly directed to an improvement therein which eliminates any flexible connections of any kind in the grounding switch and thereby increases the life span operating characteristics and reliability of the switch.

In metal enclosed pressurized gas insulated high voltage switchgear of the type described in U.S. Pats. Nos. 3,546,356; 3,573,342 and 3,643,003 all of which have been assigned to the assignee of the present invention it is conventional that the high voltage conductors be completely enclosed in grounded metal housings or covers at all points along the system. The advantage of this construction in both safety and reliability are obvious.

There is however one decided disadvantage in that it is not convenient to gain access to the high voltage conductor for low voltage tests commonly performed on a routine basis such as for example resistance tests on circuit breaker contacts, power factor tests on transformer insulation and other test operations.

Since it is desirable and even necessary periodically to measure the contact resistance of circuit breakers by the application of a known measured current across two terminals of the circuit breaker for the purpose of mearsuring the voltage drop between the terminals, it is conventional in outdoor substation design that this can be readily accomplished by clipping the test leads onto the exposed high voltage conductors at the upper ends of their bushings. However this is not possible in metal enclosed pressurized systems since the high voltage conductors are not exposed at any point along the system.

BRIEF DESCRIPTION OF THE INVENTION

The present invention differs primarily from the invention disclosed in the above-mentioned application Ser. No. 450,466 filed Mar. 12, 1974 (U.S. Pat. No. 3,876,846) in that flexible leads in the grounding or testing device are eliminated thereby increasing the life of the system and device and increasing the operating reliability thereof while nevertheless maintaining the integrity of the seal of the casing which encloses the insulating gas of the high voltage system.

This invention is therefore characterized by providing a combination ground and test switch apparatus for pressurized gas insulated high voltage systems and the like which maintains the integrity of the pressurized system and which may be selectively operated to provide either grounding or voltage testing without the need for either depressurizing or removal of any of the system grounded housings or covers.

The present invention comprises a housing joined to the grounded enclosure of a pressurized gas insulated high voltage system and hermetically sealed thereto with an opening provided in the aforesaid grounded housing to provide communication between the interior of the switchgear and the housing affixed thereto. The opening in the grounded housing and the communication between said opening and the interior of the switchgear and the housing therefor are of course hermetically sealed in order to preserve the integrity of the system.

A reciprocally movable switch blade is mounted within the said housing and is arranged to be moved to a closed position within the interior of the switchgear equipment for engagement with a jaw structure which is surrounded by an electrostatic shield to reduce dielectric stresses within the switchgear. An operating mechanism which may be manipulated from the exterior of the housing is provided for moving the switch blade between its connected and disconnected positions.

The end of the switch housing remote from the switchgear grounded housing is provided with a conductive terminal electrically insulated from the test switch housing and is electrically coupled to the movable blade by sliding contact mechanism which differs completely in operation and durability from the flexible conductor previously used and which is provided to allow for free reciprocal movement of the switch blade without in any way affecting the integrity of the electrical connection therebetween.

A conductive ground strap is normally coupled between the aforementioned terminal and the switchgear grounded housing to maintain the conductive components of the switch housing at ground potential when no tests are being performed.

During the intervals when such tests are to be performed the conductive ground strap is first removed and the switch blade is operated to the closed position to establish an electrical connection between the aforementioned terminal and the central conductor of the switchgear network. A voltage source may then be coupled across the grounded housing and the aforementioned terminal for test purposes without the need for either depressurizing the switchgear equipment or removing any of its housings or covers.

It is therefore a primary object of the present invention to provide a novel test switch assembly and housing adapted for selectively and simply performing tests upon the internal high voltage conductor of metal enclosed pressurized gas insulated high voltage switchgear while avoiding the need for either depressurizing the switchgear network or removing any of its housings or covers.

It is a further object of the present invention to provide contact connections between the reciprocally removable blade of the grounding structure and the remainder of the grounding structure thereby avoiding the need for flexible connections and thereby increasing the durability and reliability of the grounding structure.

It is still a further object of the present invention to arrange a grounding and test switch for an enclosed, sealed, gas filled electrical structure and devices which perform the grounding and testing functions but is not required to perform any disconnect function, the disconnect function being provided by additional disconnect switch structure.

It is still a further object of the present invention to so arrange the grounding and test switch so that it may inherently be provided with a similified testing function which may be connected therethrough.

The foregoing and other objects of the present invention will become apparent from the following description and drawins in which:

FIG. 1 is a schematic elevational section of a similified form of ground and test switch assembly abiding the principles of the present invention.

FIG. 2 is a cross-sectional view taken from line 2—2 of FIG. 1 looking in the direction of the arrows.

FIG. 3 is a schematic view of a modified form of the structure of the present invention which also develops an open gap in the main current carrying conductor.

FIG. 4 is a cross-sectional view taken from line 5—5 of FIG. 4 looking in the direction of the arrows.

FIG. 5 is a view partly in cross-section taken from line 5—5 of FIG. 4 looking in the direction of the arrows.

FIG. 6 is a side view partly in section of a commercial form of the present invention utilizing the principles set forth in connection with FIGS. 1 and 2.

FIG. 7 is an end view partly in section of the structure of FIG. 6.

FIG. 8 is a top view of the structure of FIG. 6.

Figure 9:
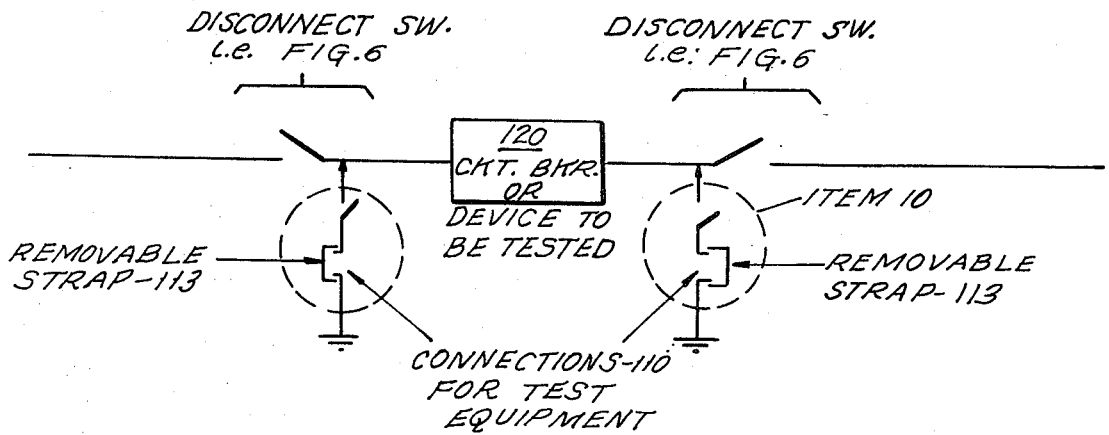
FIG. 9 is a simplified circuit diagram showing the utilization of the present invention in a simplified version where it is not necessary to open the central conductor.

Referring now to the drawings it should be kept in mind that the above mentioned U.S. Pat. No. 3,876,846 discloses a metal enclosed pressurized gas insulated high voltage circuit breaker in which the high voltage conductors are completely enclosed in grounded metal covers at all points.

In equipment of this type as well as other components of such a switchgear and/or power distribution or transmission network it becomes desirable and even necessary at periodic intervals to measure the contact resistance of the circuit breakers as well as of other components by application of a known measured current from one terminal of the breaker to the other in order to measure the voltage drop between terminals.

Since the central conductors are metal enclosed within conductive pressurized housings at all points it is an object of the present invention to provide an assembly 10 of the type shown in FIGS. 1 and 2 to perform the necessary test procedures without the need for depressurizing the system or removing any portion of the enclosure to gain access to the high voltage conductor.

In pressurized gas systems of this type it is further necessary to provide means for grounding the internal high voltage conductor to provide complete safety for personnel at such times when it becomes necessary to open the enclosure and gain access to internal parts for inspection, maintenance or repair.

Grounding switches which establish a good metal connection between the internal conductor and the grounded metal enclosure are well known in the art. Such grounding switches must be capable of carrying the full ground full current capability of the electrical system at the point of connection without being damaged or destroyed.

The grounding switch assembly 10 of FIGS. 1 and 2 may be adapted for use in establishing an electrical connection with an internal conductor 11 which is energized at a high voltage in normal usage. The grounded metal enclosure 12 serves as the means for retaining the pressurized insulating gas within the hollow space 13 between the conductor 11 and the grounded housing structure 12. Suitable insulators or spacers not shown but formed of a solid material and described in detail in U.S. Pat. No. 3,573,341, for example, act to maintain appropriate spacing and centering of conductor route 11 relative to its associated grounded housing 12.

The test switch assembly 10 which may be selectively electrically connected with the switchgear high voltage conductor 11 comprises a hollow substantially cylindrical shaped housing 14 secured in any suitable manner to internal flange 15. The housing 14 has an end wall 17. A reciprocating switch blade 26 is provided which is supported in appropriate bearings formed by stationary contacts as hereinafter described and which is mounted for reciprocation under control of a crank 27 secured to an actuating shaft 28; the actuating shaft 28 is shaped in such manner that an external crank (not shown) may engage the said actuating shaft 28 and operate the same from one position (from the right-hand or withdrawn position of FIG. 1) as shown in solid lines to the (left-hand or inserted) position showin in the dotted lines of FIG. 1. While this external actuating crank is not shown in connection with the structure of FIG. 1 such a crank 27 is shown in connection with the structures of FIGS. 6 and 7 and it will be obvious that the same crank may be used for the same purpose on the hexagonal or other shaped end of shaft 28 which shaft extends from within the housing to the exterior of the housing as shown in FIG. 2, extending through appropriate seals in order that the gas may be properly contained.

Crank 27 is a bifurcated member having two arms 27a and 27b (see FIG. 2) which are also provided with suitable openings for receiving a pin 29. The pin 29 engages the slot 24a of the clevis 24 on the contact blade 26. During the movement of the crank 27 from the position shown in solid lines of FIG. 1, to move the blade to the position shown by the dotted lines of FIG. 1, the pin 29 traverses an arcuate path.

As a result of this movement the clevis assembly 24 is moved from the solid line position of FIG. 1 to a position where the blade 26 occupies the dotted line position of FIG. 1. Member 30 which carries the contact blade 26 rides on guide rods 31 to provide a rear guide for the contact blade 26.

The front flange 15 of the housing 14 is supported by a gas tight insulation assembly consisting of two flanges 40 and 72 molded to the epoxy support 60. A contact carrying ring support 42 is also secured in position against the front flange 15. A stationary contact tulip-type structure 50 is provided supported by the ring 42 so that as the blade 26 moves from the withdrawn position shown in the solid lines of FIG. 1 to the dotted line position it is always in contact with the tulip contact structure 50. This contact structure is appropriately supported on a circular bead 52 carried on a sleeve 53 which is an extension of the ring 42 and held in position by appropriate springs (not shown) in the manner in which tulip contact structures 50 are normally held in position.

The flange 72 of the ring 70 is secured in any appropriate manner as by the bolt 73 to the annular flange 74 of the tube 75, a gas tight seal being ensured by the O-ring 76.

The annular tube 75 is secured or may be made a part of the housing 12 and surrounds the opening 80 into the housing 12. The opening 80 is located opposite that portion of the conductor 11 which is provided with a set of tulip contacts 82 and thus provides a means for receiving the end of the contact blade 26 when it is moved from the solid line position of FIG. 1 to the dotted line position.

In normal operation of the device the blade 26 is in the solid line position and no grounding or other connection is made to the principal current carrying member 11 within the housing 12. When however the shaft 28 is rotated by the external crank 30 to operate the internal crank 27 within the housing 14 to move the blade 26 from the solid line position of FIG. 1 to the dotted line position of FIG. 1 then the blade 26 extends from adjacent the opening 80 in the housing 12 diametrically through the housing 12 until it engages the tulip contacts 82 on the conductor 11.

As will be seen more particularly from FIG. 2, the shaft 28 is provided with appropriate sealed bearings 90 so that it may penetrate the housing 14 while at the same time not permit the escape of any of the gas within the housing 14 or contamination of the gas. The tulip contact structure is so shaped as is well known in the formulation of tulip contacts so that gas may pass the contacts and into the housing 14 so that pressure is equalized between the housing 14 and the interior 13 of housing 12 and so that the grounding and testing contact structure, the operation of which is more specifically hereinafter described, is fully contained within the housing; and no contamination or contact of the said gas with either the exterior of the structure or any contaminant can occur.

The ring 40 bolted to ring 42 having the extension 53 which carries the tulip contact 50 is of conductive material and is provided at its lower end with a conductive extension 110. Similarly the ring 72 is provided at its lower end with the conductive extension 111. These conductive extensions 110, 111 are interconnected by the strap 113 in a suitable manner as for instance by the bolts 114, 114 to provide appropriate means to which connectors may be secured for testing purposes. Grounding is accomplished by the housings 14 and 12.

The connection (and circuit therefore) are shown in FIGS. 9 and 12. The structure thus far described is schematically shown in FIG. 9.

In FIGS. 3, 4 and 5 a somewhat different structure is shown still following the principles of the present invention but also having provision for opening the central conductor in order to provide for appropriate testing. See also the circuit diagram of FIG. 10.

Basically therefore for the structure shown in FIGS. 1 and 2 the U-shaped aluminum strap 113 provides a ground path whenever the switch is closed. It may however be utilized for testing purposes. When the part of the system to be tested is deenergized the ground switch is closed insuring a deenergized conductor. The U-shaped aluminum strap 113 is then removed and test equipment is connected to the ground switch mechanical housing at extension 110 thereof a main switch 501 (FIGS. 6, 7 and 8) may also be enclosed in the section of the bus housing 12 to which the grounding switch structure 14 is connected, the switch 501 having an operating handle 502 disposed on the opposite side of the bus housing from the grounding switch. This main switch has not been heretofore referred to nor is it described in detail because it forms no part of the present invention.

Figure 10:
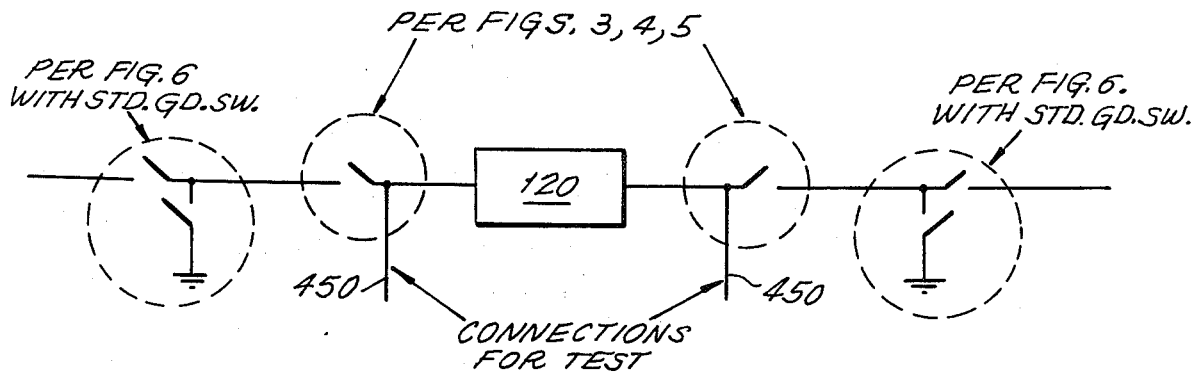
FIG. 10 is a simplified circuit diagram wherein it is necessary to open the central conductor when testing.

Referring now to FIGS. 3, 4 and 5 there is here shown an alternate structure in which provision is made for opening the main conductor (see FIG. 10). In this case the gas enclosure 314 for the bus is provided with an extension bushing 315 of an epoxy insulating material which communicates with the opening 316 in the gas tight enclosure 314. An appropriate annular seal 317 is provided by O-rings in the annular channels 320 in order to maintain a gas tight seal. In this case the operating member for the grounding contact which may also be a disconnect contact is the sliding and rotatable rod 325 which slides in the epoxy bushing 315. The rod 325 actually slides in the insert 326 of the bushing 315 which is integrated therewith. The said insert 326 is provided with annular recesses 327 to comprises O-rings against the sliding contact operating rod 325. An annular sealing nut or member 330 is provided at the outer end of the insert 326 of bushing 315 in order to close that end of the bushing when operating handle 334 is removed at bolted connection 455. In this case, the sealing cap 330 is screwed on to the insert 326.

The contact rod 325 may slide between the solid line position 333 and the dotted line position 332 as shown in FIG. 4. When it is in the solid line position 333 then the rod and its operating handle 334 are in a position wherein they perform no function. When however the rod 325 and the operating handle 334 are pushed from the solid line position of 333 to the dotted line position of 332 then the end 340 of the rod 325 is so arranged that it will interengage the end of the operating shaft 341 of the disconnect and grounding switch which is located within the enclosure 314.

The handle 334 must of course be oriented to permit such interengagement to occur and for this purpose the rod 325 is provided with the radial blocking extension 345 which will permit entry of the end 340 of the rod 325 to engage the contact operating shaft 341 only in the correct orientation of the rod 325 and the handle 334. The opening 350 in the contact operating support enclosure 351 within the enclosure 314 is provided with a key shaped slot which will permit the extension 315 to enter therein only in the appropriate orientation and which will then lock the extension behind the wall of the tubular member 351 once the rod 325 has been rotated by handle 334 to any position other than the original or non-grounded position.

When it is desired to operate the disconnect and grounding switch 400 of FIG. 3, the handle 334 and the contact operating rod 325 are pushed in until the end 340 of the rod engages the shaft 341. An appropriate clevis arrangement or hexagonal arrangement or other arrangement or connection may be made between the end 340 of the contact operating rod 325 and the rotatable shaft 341 to permit this interengagement to take place. On such interengagement the shaft 341 may be rotated by rotating the handle 334 and the contact operating rod 325. Rotation of the handle 334 and rod 325 rotates the shaft 341 and therefore rotates the crank 360 which is secured thereto. The crank is connected at pin 361 to the link 362 which in turn is connected by pin 363 to the link 364 and to the movable contact operating arm 365.

The terminal 370 of the circuit breaker within the enclosure 314 is electrically connected to the tube 351 which in turn is connected to the stationary contact 375. The arm 365 carries the movable bridging contact 376 which when the contact operating arm 365 is extended (upwardly as seen in FIG. 4) bridges the gap between the stationary contact element 375 and the stationary contact element 380 thereby establishing a current carrying connection through the stationary contact element 380.

It will now be obvious that when the handle 334 is moved from the solid line position shown in FIG. 5 to the dotted line position 332 and then engaged with the contact operating shaft 341, the bridging contact 376 may be moved from the dotted line position shown in FIG. 3 to the solid line position shown in FIG. 3 to establish the open gap condition. Connections made to extensions 450 allow tests to be performed. At this point it will be noted that the handle 334 cannot be pulled out at any time or disengaged until the reverse operation takes place; that is, when handle 334 is rotated so that the bridging contact 376 moves to the fully closed position shown by the dotted lines of FIG. 3, then, only at that full closed position does the upwardly extending element 345 at the end 340 of the contact operating arm 325 permit the handle 334 and the contact operating rod 325 to be withdrawn to the solid line position shown in FIG. 6. At this point the circuit breaker switch or other device may be put back in service.

By this means therefore a simplified ground test switch connection is obtained by operation of the handle 334 first inwardly and then rotating it in order to obtain both the connection and disconnection.

In FIGS. 6, 7 and 8 the housing 14 for the structure is shown connected to the bus enclosure. The location of strap 113 may also be seen.

The valve operators 420, 421 and the pipe arrangement 422 is provided for the purpose of controlling the gas and forms no part of the present invention. The housings 14, 14 for the structures of FIGS. 1 and 2 are clearly shown and the internal structures with which they cooperate are indicated in dotted lines, the basic structure being however already described in the patents previously referred to.

One of the essential elements provided by the operating mechanism of either FIGS. 1 and 2 or the alternate operating mechanism of FIGS. 3, 4 and 5 is that, instead of a flexible braid or pigtail which provides unexpected problems and may result in unexpected contamination because of the manner in which the pigtail is necessarily braided, there is provided instead a positive switching arrangement positively operated by a contact operating arm in which a contact is either made to the contact 82 in the bus 11 as shown in FIGS. 1 and 2 or in which a contact is made to the stationary contact 380 as shown in FIGS. 4, 5 and 6.

FIGS. 9 and 10 show schematic diagrams respectively for the FIGS. 1 and 2 structure and the FIGS. 3, 4 and 5 structure. The connections, as described above, are shown with appropriate legends to clarify the operation.

In summary, this disclosure shows two types of ground and test devices:

A. The type where it is not necessary to open the central conductor other than at standard disconnect switch locations. This is shown by FIGS. 1, 2, 6, 7 and 8.

B. A type where it is necessary to open the central conductor as shown by FIGS. 3, 4 and 5.

The structures of 6, 7 and 8 show a disconnect switch enclosure as manufactured for mounting on a circuit breaker with a simplified ground and test device 14 incorporated. Bus enclosure 401 would normally connect to the circuit breaker and 401A would normally connect to the rest of the installation. If the alternate version is required, housing 314 FIG. 4 would be connected to member 401 FIG. 6 and test device 14 in FIG. 5 would be a standard ground switch with no test provisions.

By this means a definite grounding operation is performed. Positive contact is made through the tulip-type contact therein shown and no reliance is placed on the flexible braided or pigtail type connection which may fail or deteriorate at an unexpected time under unexpected usage.

In the foregoing the present invention has been described solely in connection with preferred illustrative embodiments thereof. Since many variations and modifications of the present invention will now be obvious to those skilled in the art it is preferred that the scope of this invention be defined not by the specific embodiments herein contained but only by appended claims.

The embodiments of the invention in which an exclusive privilege or property is claimed are defined as follows:

1. For use in a metal-enclosed pressurized-gas-insulated high-voltage switchgear system. a double-purpose grounding and test switch assembly capable of grounding high-voltage internal conductor and of permitting a non-grounded electrical connection to the internal conductor for test purposes, said assembly comprising:

a grounded conductive housing completely surrounding said internal conductor and having an opening provided therein;

a switch housing mechanically and electrically connected to said grounded conductive housing and having an opening at a first end thereof whereby the pressurized interior of the grounded conductive housing communicates with the interior of said switch housing to maintain an equalized gas pressure therebetween;

a reciprocating conductive switch blade;

guide means mounted within said switch housing for guiding said conductive switch blade to move along a substantially linear path and through the grounded conductive housing opening;

the internal conductor including a jaw blade structure;

drive means mounted within said switch housing for moving said conductive switch blade from a first position whereby its free end is disengaged from the jaw contact structure to a second position whereby the free end of said conductive switch blade electrically engages the jaw structure;

a terminal mounted to the free end of said switch housing remote from the grounded conductive housing and electrically insulated therefrom;

an additional stationary contact; said stationary contact being mounted on and forming part of the guide means for said reciprocating conductive switch blade; said additional stationary contact being at all times electrically connected to said reciprocating conductive switch blade; and permitting free reciprocating movement of said reciprocating conductive switch blade to engage and disengage said jaw structures said additional stationary contact being electrically connected to said terminal;

said guide means also including means for electrically insulating said conductive blade and the stationary contact in which it slides from the grounded conductive housing and said test switch housing;

said drive means including an actuating shaft having one end thereof extending outwardly from said switch housing to provide for movement of said conductive switch blade from and to a position exterior of said switch housing; said terminal being selectively connected to ground potential or to test equipment.

2. The device of claim 1 further comprising a conductive strap selectively connectible between said terminal and said switch housing for maintaining said conductive switch blade at the voltage level of said grounded conductive housing.

3. The device of claim 1 wherein said drive means further comprises a crank arm formed of an insulating material coupled to said operating shaft for pivoting said crank arm about said operating shaft when said shaft is rotated;

a clevis assembly coupled to the end of said conductive switch blade remote from the internal conductor;

means for coupling the free end of said crank arm to said clevis assembly.

4. The apparatus of claim 3 wherein said drive means is further comprised of means for providing an airtight seal in the region where said operating shaft protrudes from said switch housing to prevent the escape of the pressurized gas contained therein.

5. The device of claim 1 having a conductive strap selectively connectible between said electrical terminal and ground potential for maintaining said conductive switch blade at the voltage level of said grounded conductive housing when said conductive strap is electrically connected to both said electrical terminal and ground potential;

said conductive strap designed to be removable to disconnect the electrical connection between said electrical terminal and ground potential to thereby permit a non-grounded electrical connection to be made from test equipment to the internal conductor through said electrical terminal and said conductive switch blade without the need to depressurize the switchgear system and without the need to remove either said switch housing or the grounded conductive housing.

6. The device of claim 5 wherein said switch housing and the grounded conductive housing are mechanically and electrically secured to each other so that they are both maintained at the same ground potential.

7. The device of claim 6 wherein said drive means moves a portion of said conductive switch blade through the opening of said switch housing and the opening of the grounded conductive housing to mechanically and electrically engage the internal conductor.

* * * * *